(12) United States Patent
Luciano et al.

(10) Patent No.: US 12,244,661 B2
(45) Date of Patent: *Mar. 4, 2025

(54) SYSTEMS AND METHODS FOR ADAPTIVE SECURITY AND COOPERATIVE MULTI-SYSTEM OPERATIONS WITH DYNAMIC PROTOCOLS

(71) Applicant: The Western Union Company, Denver, CO (US)

(72) Inventors: Christopher J. Luciano, Montvale, NJ (US); Pankaj Jain, Montvale, NJ (US); Praveen K. Makhija, Montvale, NJ (US); Alexander Varakin, Parsippany, NJ (US); Wrena Dsouza, San Ramon, CA (US)

(73) Assignee: The Western Union Company, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/240,577

(22) Filed: Aug. 31, 2023

(65) Prior Publication Data
US 2024/0015200 A1    Jan. 11, 2024

Related U.S. Application Data

(63) Continuation of application No. 17/154,972, filed on Jan. 21, 2021, now Pat. No. 11,765,221.
(Continued)

(51) Int. Cl.
*H04L 29/06* (2006.01)
*H04L 67/01* (2022.01)
*H04L 67/02* (2022.01)

(52) U.S. Cl.
CPC .............. *H04L 67/01* (2022.05); *H04L 67/02* (2013.01)

(58) Field of Classification Search
CPC ......... H04L 67/01; H04L 67/02; H04L 29/06; H04L 67/42
(Continued)

(56) References Cited

U.S. PATENT DOCUMENTS 7,012,919 B1    3/2006  So et al.
8,412,360 B2    4/2013  Jia et al.
(Continued)

FOREIGN PATENT DOCUMENTS

JP          2002007596 A    1/2002

OTHER PUBLICATIONS

Maurer, B., "Retail Electronic Payments Systems for Value Transfers in the Developing World," Dept. of Anthropology, University of California, 2008—doc.presentica.com, 31 pages.
(Continued)

*Primary Examiner* — Jude Jean Gilles
(74) *Attorney, Agent, or Firm* — Kilpatrick Townsend & Stockton LLP

(57) ABSTRACT

Systems, methods, and machine-readable media are provided to facilitate adaptive security and cooperative multi-system operations in conformance with dynamic protocols. An implementation of the protocol that includes parameter constraints mapped to the defined event may be generated, defining an operation flow in response to detection of a defined event at a remote system and transforming the protocol into an executable process that applies to at least one remote system. References to metadata specifications may be transmitted that include specifications of interface elements and cause interface configuring in accordance with the specifications. Upon determination that responses satisfy the parameter constraints, access to a resource may be controlled in accordance with the protocol, or, upon determination that the responses fail to satisfy the parameter
(Continued)

constraints, an alert may be transmitted that is indicative of at least one of the references and/or additional references to second metadata specifications.

20 Claims, 6 Drawing Sheets

Related U.S. Application Data

(60) Provisional application No. 63/125,300, filed on Dec. 14, 2020.

(58) Field of Classification Search
USPC .......................................................... 709/217
See application file for complete search history.

(56) References Cited

U.S. PATENT DOCUMENTS

| | | | |
|---|---|---|---|
| 8,412,630 B2 | 4/2013 | Ross et al. | |
| 8,620,799 B2 | 12/2013 | Demark et al. | |
| 9,298,806 B1 | 3/2016 | Vessenes et al. | |
| 9,697,567 B2 | 7/2017 | Demark et al. | |
| 10,102,571 B2 | 10/2018 | Demark et al. | |
| 10,235,704 B2 | 3/2019 | Demark et al. | |
| 10,367,905 B2 | 7/2019 | Kouru et al. | |
| 10,984,459 B2 | 4/2021 | Demark et al. | |
| 11,057,464 B1* | 7/2021 | Wei | G06F 3/0656 |
| 11,258,875 B2 | 2/2022 | Kouru et al. | |
| 11,663,639 B2 | 5/2023 | Demark et al. | |
| 11,765,221 B2* | 9/2023 | Luciano | H04L 67/34 |
| 2003/0028481 A1 | 2/2003 | Flitcroft et al. | |
| 2003/0065805 A1* | 4/2003 | Barnes, Jr. | G06Q 30/0643 709/244 |
| 2003/0220835 A1* | 11/2003 | Barnes, Jr. | G06Q 10/02 379/93.12 |
| 2004/0006531 A1 | 1/2004 | Kwan | |
| 2007/0083462 A1 | 4/2007 | Cubillo et al. | |
| 2008/0034061 A1 | 2/2008 | Beares | |
| 2009/0089193 A1 | 4/2009 | Paintin | |
| 2009/0204772 A1 | 8/2009 | Kolze | |
| 2009/0210340 A1 | 8/2009 | Mittal et al. | |
| 2010/0010935 A1 | 1/2010 | Shelton | |
| 2010/0030578 A1 | 2/2010 | Siddique et al. | |
| 2010/0241546 A1 | 9/2010 | Thomas et al. | |
| 2011/0112957 A1 | 5/2011 | Ingram et al. | |
| 2011/0166928 A1 | 7/2011 | Robinson et al. | |
| 2011/0265148 A1 | 10/2011 | Tam et al. | |
| 2011/0320342 A1 | 12/2011 | Kremen | |
| 2012/0130876 A1 | 5/2012 | Voisin | |
| 2012/0179753 A1 | 7/2012 | Welingkar et al. | |
| 2012/0185383 A1 | 7/2012 | Demark et al. | |
| 2012/0197731 A1 | 8/2012 | Rampell et al. | |
| 2012/0203663 A1 | 8/2012 | Sinclair et al. | |
| 2012/0209677 A1 | 8/2012 | Mehta et al. | |
| 2014/0156435 A1 | 6/2014 | Rahman et al. | |
| 2014/0188661 A1 | 7/2014 | Demark et al. | |
| 2014/0201070 A1 | 7/2014 | Liberty | |
| 2015/0356674 A1 | 12/2015 | Demark et al. | |
| 2016/0210631 A1 | 7/2016 | Ramasubramanian et al. | |
| 2017/0118301 A1 | 4/2017 | Kouru et al. | |
| 2017/0270605 A1 | 9/2017 | Demark et al. | |
| 2018/0152845 A1 | 5/2018 | Unnerstall et al. | |
| 2018/0253559 A1 | 9/2018 | Satpathy et al. | |
| 2019/0122276 A1 | 4/2019 | Demark et al. | |
| 2019/0205468 A1* | 7/2019 | Barnes, Jr. | G06F 16/635 |
| 2019/0327329 A1 | 10/2019 | Kouru et al. | |
| 2020/0382764 A1 | 12/2020 | Oyman et al. | |
| 2021/0182082 A1* | 6/2021 | Mickelsson | H04L 41/0813 |
| 2021/0209855 A1* | 7/2021 | Stokking | G06T 7/50 |
| 2023/0090324 A1* | 3/2023 | Ran | G06Q 30/0621 717/171 |

OTHER PUBLICATIONS

Spagnuolo et al., "Bitiodine: Extracting Intelligence from the Bitcoin Network", In International Conference on Financial Cryptography and Data Security, vol. 8437, Mar. 2014, pp. 457-468.

* cited by examiner

SYSTEMS AND METHODS FOR ADAPTIVE SECURITY AND COOPERATIVE MULTI-SYSTEM OPERATIONS WITH DYNAMIC PROTOCOLS

CROSS-REFERENCES TO RELATED APPLICATIONS

This application is a continuation of U.S. application Ser. No. 17/154,972, filed Jan. 21, 2021, which claims the benefit of and priority to U.S. Provisional Application No. 63/125,300, filed Dec. 14, 2020, each of which is hereby incorporated by reference in its entirety for all purposes.

FIELD

Disclosed embodiments according to the present disclosure relate generally to cooperative multi-system operations, and in particular to systems, methods, and computer-readable media for adaptive security and cooperative multi-system operations in conformance with dynamic protocols.

BACKGROUND

Cooperative multi-system operations over networks and in various locations around the world can be encumbered by various needs, such as needs to verify data associated with various events, various user devices, accesses to resources, service requests, service provisioning, etc. For example, access requests may include credentials, codes, and verification information that are needed to determine whether resource access is to be granted, but additional constraints may also be required depending on the context and a variety of factors, including locations of the systems and user devices. The inflexibility of conventional systems to address changing needs and contexts can require substantial, resource-consuming effort and time to, for example, change hardcoding, change or create numerous templates, and reconfigure systems. The lack of flexibility and speed to address the changes compromises outcomes for the collection of the systems and user devices. Thus, there is a need to solve these problems and provide for systems, methods, and computer-readable media for adaptive data security and cooperative multi-system operations in conformance with dynamic protocols. These and other needs are addressed by the present disclosure.

BRIEF DESCRIPTION OF THE DRAWINGS

The present disclosure is described in conjunction with the following appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Among other things, disclosed embodiments according to the present disclosure may provide for technological solutions to problems with conventional systems, problems including the inflexibility of conventional systems to address changing needs and contexts can require substantial, resource-consuming effort and time to, for example, change hardcoding, change or create numerous templates, and reconfigure systems. Disclosed embodiments may provide for technological solutions to the lack of flexibility and speed of conventional systems to address the changes. Various embodiments will now be discussed in greater detail with reference to the accompanying figures, beginning with FIG. 1.

Figure 1:
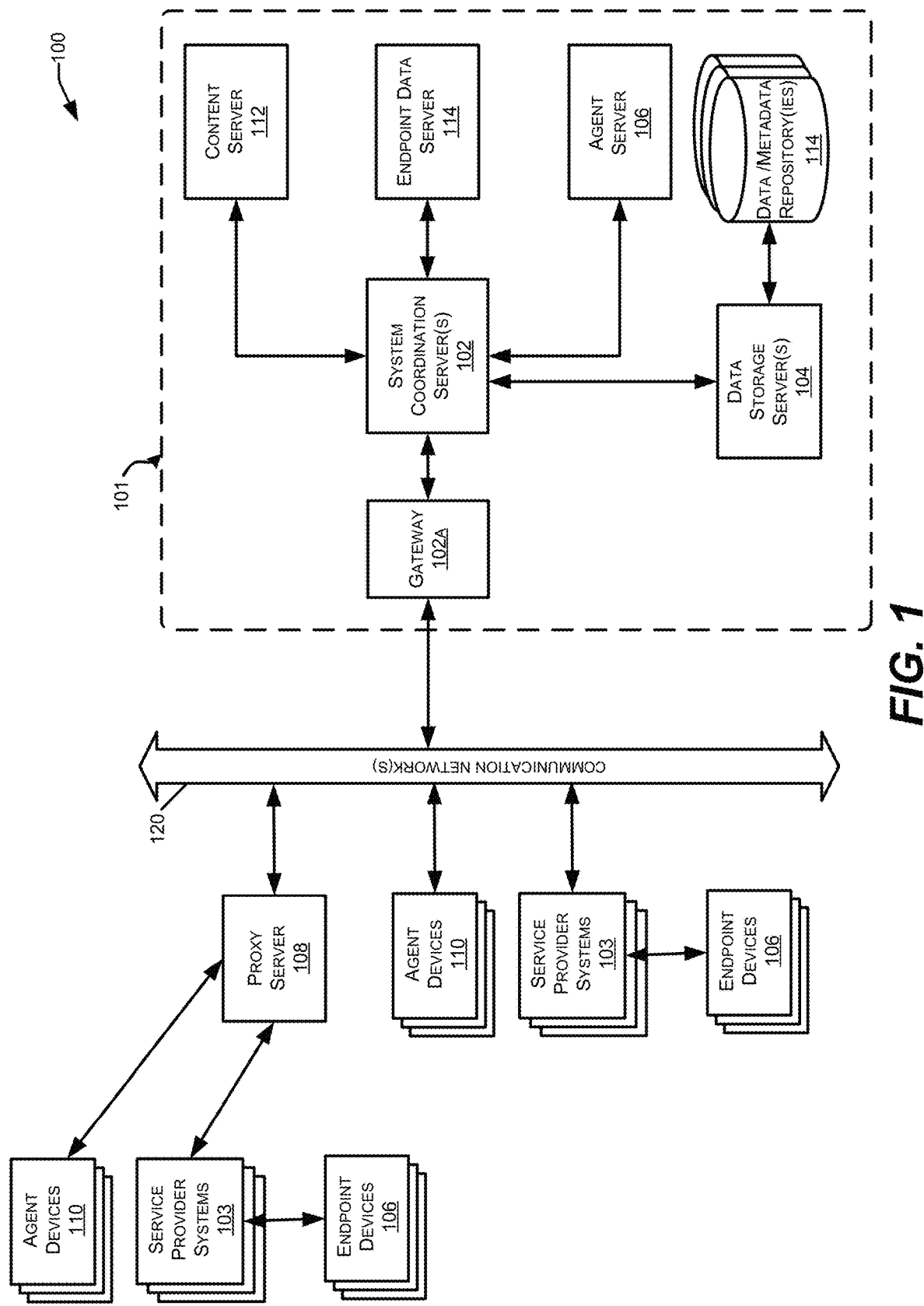
FIG. 1 illustrates a block diagram of various components of an example network which implements and supports various embodiments to facilitate adaptive data security and cooperative multi-system operations in conformance with dynamic protocols, in accordance with disclosed embodiments according to the present disclosure.

With reference now to FIG. 1, a block diagram is shown illustrating various components of an example network 100 which implements and supports various embodiments to facilitate adaptive data security and cooperative multi-system operations in conformance with dynamic protocols. The network 100 may allow for controlling resource access and operations across a plurality of systems and devices. The network 100 includes a plurality of computing systems and endpoint computing devices corresponding to multiple geographic and/or virtual locations, regions, and/or domains, for instance, different geographic areas, different data centers, different networks, different computing infrastructures, etc. Various embodiments may include many such systems and endpoint devices. Each of the multiple systems may, for example, be configured to perform a different type of operation, to use different resources and/or different types of resources, to generate different types of outputs, to be located at different geographical locations, to correspond to (e.g., to grant access to) different agents or users, and so on.

For brevity, the network 100 is depicted in a simplified and conceptual form, and may generally include more or fewer systems, devices, networks, and/or other components as desired. The network 100 may include several physical components and/or several virtual components such as, for example, one or several cloud computing components. In general, the network 100 may include one or more communication networks 120 that can be used for bi-directional communication paths for data transfer between components of network 100. The communication networks 120 may include any number of different types of networks enabling communication between the various computing devices, servers, and other components of the network 100, such as, for example, computer networks, telecommunications networks, wireless networks, and/or any combination of these and/or other networks.

The network 100 may further include one or more systems 101 to facilitate adaptive data security and cooperative multi-system operations in conformance with dynamic protocols. Among other things, the network 100 may also include one or more remote systems 103, which may correspond to service provider systems 103, one or more endpoint devices 106, and/or one or more agent devices 110, each of which may be communicatively couplable with the system 101 via the communication networks 120. As disclosed further herein, the system 101 may monitor, process data from, and re-configure each of the one or more systems 103 and/or one or more agent devices 110.

The system 101 may include one or more system coordination servers 102. The system coordination servers 102 may include any suitable type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. System coordination servers 102 may include one or more server farms, clusters, or any other appropriate arrangement and/or combination or computer servers. System coordination servers 102 may operate according to stored instructions located in a memory subsystem of the servers 102, and may run an operating system, including any suitable server operating system and/or any other operating systems discussed herein. In some embodiments, the remote systems 103 may include some of the same or similar physical and logical components as the system 101.

In some embodiments, one of the elements of the system 101 may be a gateway 102A that communicates with other elements of the network 100 through a secure connection using a communication module over the network(s) 120. The gateway 102A may include a hardware and/or virtual software appliance installed at the system 101 and, in various embodiments, may correspond to the one or more coordination servers 102, may be integrated with the one or more coordination servers 102, or may be separate from but communicatively coupled to the one or more coordination servers 102. The gateway 102A may be configured to operate as a control point for the interface between the system 101 and the other components of the network 100 while providing access security, data security, auditing and monitoring capabilities, and/or integration with external systems that are remotely located away from the system 101. In some embodiments, the gateway 102A may include or correspond to API gateway configured to provide a service for provisioning and monitoring APIs (e.g., REST, HTTP, WebSocket, and/or the like APIs). The system 101 may be extended provide a multi-region deployment, with multiple instances of the components illustrated being configured for particular geographical regions. Thus, for example, multiple gateways 102A, servers, databases/repositories, and/or the like may be deployed and configured to provide services to multiple regions.

The system 101 may include one or more data storage servers 104, which may include file-based storage systems, block storage systems, and/or cloud object storage systems. Data storages 104 may comprise stored data germane to the functions of the network 100. Illustrative examples of data storages 104 that may be maintained in certain embodiments of the network 100 are described below. In some embodiments, multiple data storages may reside on a single server 104, either using the same storage components of server 104 or using different physical storage components to assure data security and integrity between data storages. In other embodiments, each data storage may have a separate dedicated data storage server 104.

The data storage servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the data storage server 104, and particularly, the tier 0 storage is the fastest storage that is not RAM or cache memory. In some embodiments, the tier 0 memory can be embodied in solid state memory such as, for example, a solid-state drive (SSD) and/or flash memory. In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatively connected such as, for example, by one or several fiber channels. In some embodiments, the one or several disks can be arranged into a disk storage system, and specifically can be arranged into an enterprise class disk storage system. The disk storage system can include any correct level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives (e.g., Serial AT Attachment drives) or one or several NL-SATA drives. In some embodiments, the one or several hardware and/or software components of the data storage server 104 can be arranged into one or several storage area networks (SAN), which one or several storage area networks can be one or several dedicated networks that provide access to data storage, and particularly that provides access to combined (eliminating data not useful), block level data storage. A SAN typically has its own network of storage devices that are generally not accessible through the local area network (LAN) by other devices. The SAN allows access to these devices in a manner such that these devices appear to be locally attached to the endpoint device.

The endpoint devices 106 and agent devices 110 may display content received via the network 100 and may support various types of endpoint interactions with the content. The endpoint devices 106 and agent devices 110 may include mobile devices such as smartphones, tablet computers, digital assistants, wearable computing devices, bodily implanted communication devices, vehicle-based devices, and/or the like. Such mobile devices may run a variety of mobile operating systems and may be enabled for Internet, e-mail, short message service (SMS), Bluetooth®, mobile radio-frequency identification (M-RFID), near-field communication (NFC), and/or other communication protocols. Within a network 100, mobile devices 106 may be configured to support mobile resource value transfer authorization and transfer functionalities. In some cases, mobile devices 106 may execute a mobile application to store user data and support secure data and/or value transfers via various different techniques, for example, SMS-based transactional value transfers, Web Application Protocol mobile value transfers, and NFC-based value transfers. Other endpoint devices 106 and agent devices 110 may be special-purpose computing devices including, by way of example, personal computers, laptop computers, workstation computers, projection devices, and interactive room display systems. Additionally, endpoint devices 106 and agent devices 110 may be any other electronic devices, such as a thin-client computers, an Internet-enabled gaming systems, appliances, and/or personal messaging devices, capable of communicating over network(s) 120. In some embodiments, one or more endpoint devices 106 and/or agent devices 110 may include terminals, resource transfer terminals, and/or the like.

In different contexts of networks 100, the endpoint devices 106 and agent devices 110 may correspond to different types of specialized devices. In some embodiments, the endpoint devices 106 and agent devices 110 may operate in the same physical location 107. In such cases, the devices may contain components that support direct communications with other nearby devices, such as wireless transceivers and wireless communications interfaces, Ethernet sockets or other Local Area Network (LAN) interfaces, etc. In other implementations, the endpoint devices 106 and agent devices 110 need not be used at the same location 107, but may be used in remote geographic locations in which each endpoint device 106 and agent device 110 may use security features and/or specialized hardware (e.g., hardware-accelerated SSL and HTTPS, WS-Security, firewalls, etc.) to communicate with the system coordination server 102 and/or other remotely located endpoint devices 106. Additionally, different endpoint devices 106 and agent devices 110 may be assigned different designated particularized sets of access permissions and, in such cases, the different devices may be provided with additional hardware and/or software components to provide content and support endpoint capabilities not available to the other devices.

The network 100 also may include one or more proxy servers 108 configured to operate between the system 102 and one or more endpoint devices 106, agent devices 110, and/or systems 103. The proxy server 108 may be configured to maintain private endpoint data at the proxy server 108 while using applications or functionalities hosted on other servers and systems of the network 100. For example, the proxy server 108 may be used to maintain private data of an endpoint within one region even though the endpoint is accessing an application hosted on a server (e.g., a remote system 103) located outside the region. In such cases, the proxy server 108 may intercept communications between an endpoint device 106 or agent device 110 and other devices that include private endpoint data. The proxy server 108 may create a token or identifier that does not disclose the private data and may use the token or identifier when communicating with the other servers and systems, instead of using the endpoint's private data.

As illustrated in FIG. 1, the system coordination server 102 may be in communication with one or more additional servers, such as a content server system 101, an endpoint data server 114, and/or an administrative server 116. Each of these servers may include some or all of the same physical and logical components as the system coordination server(s) 102, and in some cases, the hardware and software components of these servers may be incorporated into the system coordination server(s) 102, rather than being implemented as separate computer servers.

Content server system 101 may include hardware and software components to generate, store, and maintain the content resources for distribution to endpoint devices 106 and other devices in the network 100. Content server system 101 may include data storages of materials, various interface elements, page specifications, field specifications, and corresponding metadata specifications disclosed herein to provide content specifications for systems 103 and/or agent devices 110 to facilitate painting of screens of endpoint devices 106.

Endpoint data server 114 may include hardware and software components that store and process data for multiple particularized access instances relating to particularized endpoint accesses of the network 100. For example, the system coordination server 102 may record and track each endpoint's system usage, including their endpoint device 106, etc. This data may be stored and processed by the endpoint data server 114, to support compliance documentation features disclosed herein.

Administrative server 116 may include hardware and software components to initiate various administrative functions at the system coordination server 102 and other components within the network 100. For example, the administratory server 116 may monitor device status and performance for the various servers, data storages, and/or endpoint devices 106 in the network 100. When necessary, the administrative server 116 may add or remove devices from the network 100 and perform device maintenance such as providing software updates to the devices in the network 100. Various administrative tools on the administrative server 116 may allow authorized endpoints to set endpoint access permissions to various content resources, monitor resource usage by endpoints and devices 106, systems 103, and/or agent devices 110 and perform analyses and generate reports on specific endpoints and devices 106, systems 103, and/or agent devices 110.

Figure 2:
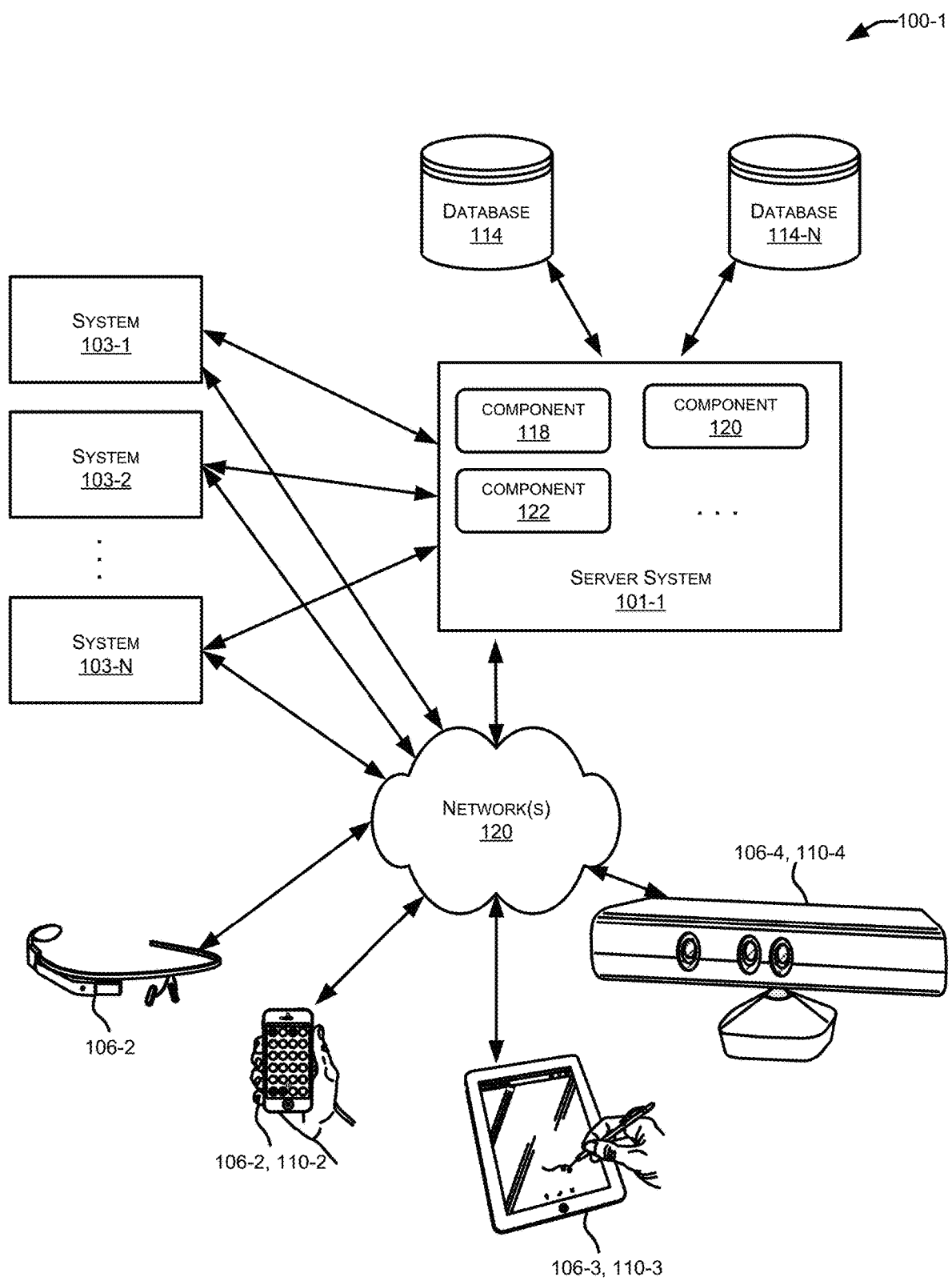
FIG. 2 depicts a simplified diagram of a network for implementing disclosed embodiments in accordance with present disclosure.

FIG. 2 depicts a simplified diagram of a network 100 for implementing disclosed embodiments in accordance with present disclosure. The selection and/or arrangement of components depicted in FIG. 2 are shown only by way of example and are not meant to be limiting. In the illustrated embodiment, network 100 includes one or more endpoint and/or agent computing devices 106 and/or 110, which are configured to execute and operate a client application such as a web browser, client, or the like over one or more network(s) 120. Server system 101 may be communicatively coupled with remote endpoint and/or agent computing devices 106 and/or 110 via network 120, as well as any number of remote systems 103 that may have at least some components that are the same as or are similar to those of the system 101 disclosed herein.

In various embodiments, server system 101 may be adapted to run one or more services or software applications provided by one or more of the components of the system. In some embodiments, these services may be offered as web-based or cloud services or under a Software as a Service (SaaS) model to the systems 103 and/or endpoint and/or agent computing devices 106 and/or 110. Users operating endpoint and/or agent computing devices 106 and/or 110 may in turn utilize one or more client applications to interact with the systems 103 and/or server system 101 to utilize the services provided by these components.

In the configuration depicted in the figure, the software components 118, 120 and 122 of system 100 are shown as being implemented on server system 101. In other embodiments, one or more of the components of system 100 and/or the services provided by these components may also be implemented by one or more of the systems 103 and/or the endpoint and/or agent computing devices 106 and/or 110. Users operating the systems 103 and/or the endpoint and/or agent computing devices may then utilize one or more client applications to use the services provided by these components. These components may be implemented in hardware, firmware, software, or combinations thereof. It should be appreciated that various different system configurations are possible, which may be different from network 100. The embodiment shown in the figure is thus one example of a network for implementing an embodiment system and is not intended to be limiting.

Endpoint and/or agent computing devices 106 and/or 110 may be portable handheld devices (e.g., an iPhone®, cellular telephone, an iPad®, computing tablet, a personal digital assistant (PDA)) or wearable devices (e.g., a Google Glass® head-mounted display), running software such as Microsoft Windows Mobile®, and/or a variety of mobile operating systems such as iOS, Windows Phone, Android, BlackBerry, Palm OS, and the like, and being Internet, e-mail, short message service (SMS), Blackberry®, or other communication protocol enabled. The endpoint and/or agent computing devices can be general purpose personal computers including, by way of example, personal computers and/or laptop computers running various versions of Microsoft Windows®, Apple Macintosh®, and/or Linux operating systems. The endpoint and/or agent computing devices can be workstation computers running any of a variety of available UNIX® or UNIX-like operating systems, including without limitation the variety of GNU/Linux operating systems, such as for example, Google Chrome OS. Alternatively, or in addition, endpoint and/or agent computing devices 106 and/or 110 may be any other electronic device, such as a thin-client computer, an Internet-enabled gaming system (e.g., a Microsoft Xbox gaming console with or without a Kinect® gesture input device), and/or a personal messaging device, capable of communicating over network(s) 120. Although exemplary network 100 is shown with four endpoint and/or agent computing devices, any number of endpoint and/or agent computing devices may be supported. Other devices, such as devices with sensors, etc., may interact with the systems 103 and/or server system 101.

Network(s) 120 in network 100 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 120 can be a local area network (LAN), such as one based on Ethernet, Token-Ring and/or the like. Network(s) 120 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

The systems 103 and/or server system 101 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server system 101 may be adapted to run one or more services or software applications described in the foregoing disclosure. For example, server system 101 may correspond to a server for performing processing described herein according to an embodiment of the present disclosure.

The systems 103 and/or server system 101 may run an operating system including any of those discussed above, as well as any available server operating system. The systems 103 and/or server system 101 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those available from AWS, Oracle, Microsoft, Sybase, IBM, and the like.

In some implementations, server system 101 may include one or more applications to analyze and consolidate data feeds and/or event updates received from the systems 103 and/or users of endpoint and/or agent computing devices 106 and/or 110. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server system 101 may also include one or more applications to display the data feeds and/or real-time events via one or more display devices of the systems 103 and/or endpoint and/or agent computing devices 106 and/or 110.

Network 100 may also include one or more databases 114. Databases 114 may reside in a variety of locations. By way of example, one or more of databases 114 may reside on a non-transitory storage medium local to (and/or resident in) server system 101. Alternatively, databases 114 may be remote from server system 101 and in communication with server system 101 via a network-based or dedicated connection. In one set of embodiments, databases 114 may reside in a storage-area network (SAN). Similarly, any necessary files for performing the functions attributed to server system 101 may be stored locally on server system 101 and/or remotely, as appropriate. In one set of embodiments, databases 114 may include relational databases, such as databases provided by AWS, that are adapted to store, update, and retrieve data in response to SQL-formatted commands.

Figure 3:
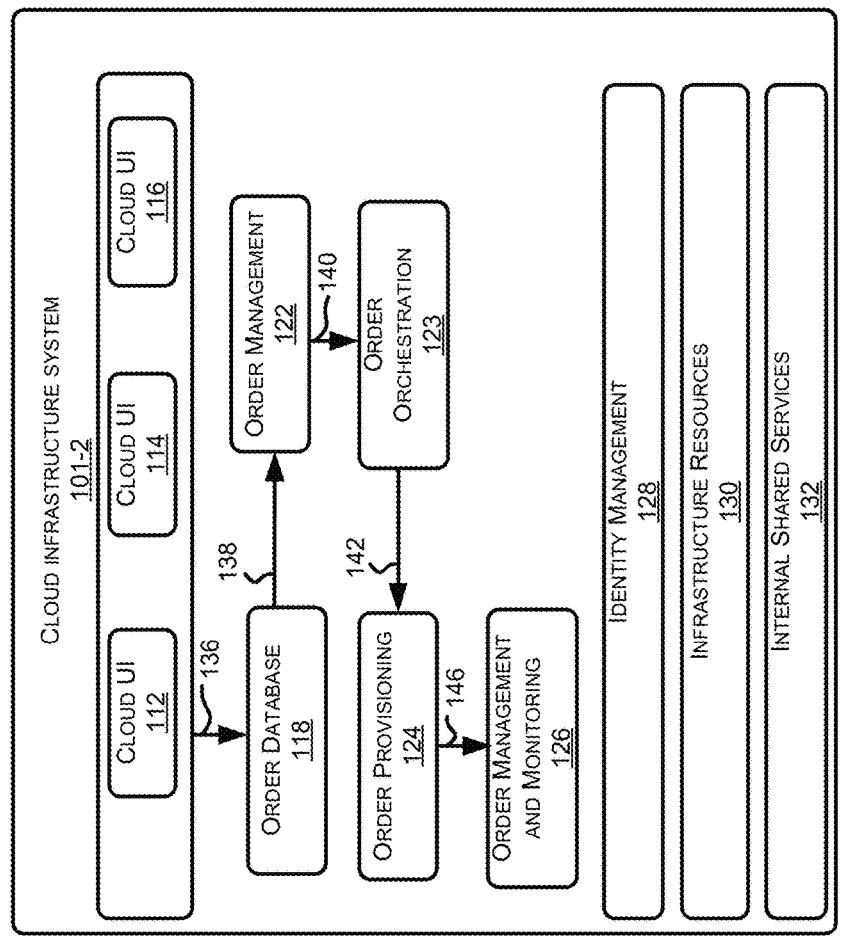
FIG. 3 is a simplified block diagram of one or more components of a system environment by which services provided by one or more components of the system may be offered as cloud services, in accordance with embodiments according to the present disclosure.
Figure 3:
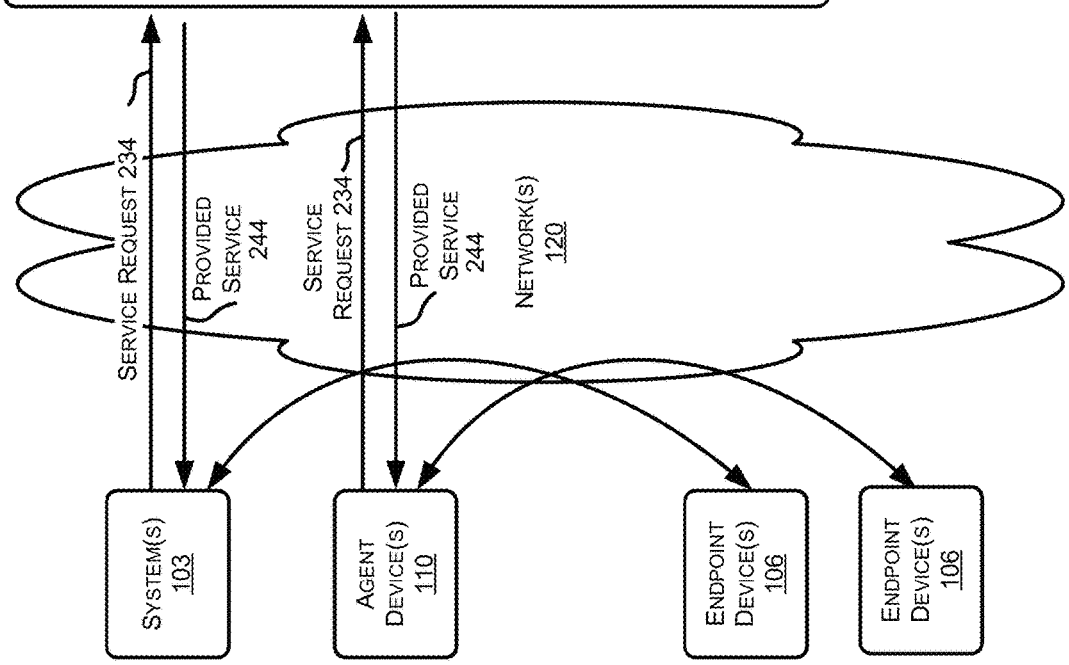

FIG. 3 is a simplified block diagram of one or more components of a system environment by which services provided by one or more components of the system 101 may be offered as cloud services, in accordance with certain embodiments of the present disclosure. In the illustrated embodiment, the system environment includes one or more service provider systems 103 and/or agent devices 110 that interact with the cloud infrastructure system 101 that provides cloud services. The endpoint devices 106 may interact with the service provider systems 103 and/or agent devices 110. The systems 103, agent devices 110, and/or endpoint devices 106 may be configured to operate a client application such as a web browser, or some other application, which may be used by a user of the client computing device to interact with cloud infrastructure system 101 to use services provided by cloud infrastructure system 101. It should be appreciated that cloud infrastructure system 101 depicted in the figure may have other components than those depicted. Further, the embodiment shown in the figure is only one example of a cloud infrastructure system that may incorporate an embodiment of the invention. In some other embodiments, cloud infrastructure system 101 may have more or fewer components than shown in the figure, may combine two or more components, or may have a different configuration or arrangement of components.

In certain embodiments, services provided by the cloud infrastructure system may include a host of services that are made available to systems 103 and/or agent devices 110, such as the dynamic services disclosed herein. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the client's own on-premises servers and systems. For example, a cloud service provider's system may host an application, and a user may, via a communication network such as the Internet, on demand, order and use the application. In certain embodiments, cloud infrastructure system 101 may include a suite of applications, middleware, and database service offerings that are delivered to a client in a self-service, elastically scalable, reliable, highly available, and secure manner.

Cloud infrastructure system 101 may provide the cloud services via different deployment models. For example, services may be provided under a public cloud model in which the services are made available to the general public or different industry enterprises. As another example, services may be provided under a private cloud model in which cloud infrastructure system 101 is operated solely for a single entity or set of entities. The cloud services may also be provided under a community cloud model in which cloud infrastructure system 101 and the services provided by cloud infrastructure system 101 are shared by several entities in a related community. The cloud services may also be provided under a hybrid cloud model, which is a combination of two or more different models.

In some embodiments, the services provided by cloud infrastructure system 101 may include one or more services provided under Software as a Service (SaaS) category, Platform as a Service (PaaS) category, Infrastructure as a Service (IaaS) category, or other categories of services including hybrid services. A client may order one or more services provided by cloud infrastructure system 101. Cloud infrastructure system 101 then performs processing to provide the services in the client's order.

In some embodiments, the services provided by cloud infrastructure system 101 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, clients can utilize applications executing on the cloud infrastructure system. Various different SaaS services may be provided.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. By utilizing the services provided by the PaaS platform, clients can employ programming languages and tools supported by the cloud infrastructure system and also control the deployed services. In some embodiments, platform services provided by the cloud infrastructure system may include database cloud services, middleware cloud services, and Java cloud services. Middleware cloud services may provide a platform for clients to develop and deploy various applications, and Java cloud services may provide a platform for clients to deploy Java applications, in the cloud infrastructure system. Various different infrastructure services may be provided by an IaaS platform in the cloud infrastructure system. The infrastructure services facilitate the management and control of the underlying computing resources, such as storage, networks, and other fundamental computing resources for clients utilizing services provided by the SaaS platform and the PaaS platform.

In certain embodiments, cloud infrastructure system 101 may also include infrastructure resources 130 for providing the resources used to provide dynamic services to clients of the cloud infrastructure system. In some embodiments, infrastructure resources 130 may include pre-integrated and optimized combinations of hardware, such as servers, storage, and networking resources to execute the dynamic services. In certain embodiments, a number of internal shared services 132 may be provided that are shared by different components or modules of cloud infrastructure system 101 and by the services provided by cloud infrastructure system 101. These internal shared services may include, without limitation, a security and identity service, an integration service, a repository service, an enterprise manager service, a virus scanning and white list service, a high availability, backup and recovery service, service for enabling cloud support, an email service, a notification service, a file transfer service, and the like. In certain embodiments, cloud infrastructure system 101 may provide comprehensive management of cloud services (e.g., SaaS, PaaS, and IaaS services) in the cloud infrastructure system.

In certain embodiments, as depicted in the figure, cloud management functionality may be provided by one or more modules, such as an order management module 122, an order orchestration module 123, an order provisioning module 124, an order management and monitoring module 126, and an identity management module 128. These modules may include or be provided using one or more computers and/or servers, which may be general purpose computers, specialized server computers, server farms, server clusters, or any other appropriate arrangement and/or combination.

In one example operation 234, a client using a client device, such as systems 103 and/or agent devices 110, may interact with cloud infrastructure system 101 by requesting one or more services provided by cloud infrastructure system 101. In certain embodiments, the client may access a cloud User Interface (UI), cloud UI 112, cloud UI 114 and/or cloud UI 116 and place an order via these UIs. The order information received by cloud infrastructure system 101 in response to the client placing an order may include information identifying the client and one or more services offered by the cloud infrastructure system 101.

After an order has been placed by the client, the order information is received via the cloud UIs, 112, 114 and/or 116. At operation 136, the order is stored in order database 118. Order database 118 can be one of several databases operated by cloud infrastructure system 118 and operated in conjunction with other system elements. At operation 138, the order information is forwarded to an order management module 122. In some instances, order management module 122 may be configured to perform verification and timing functions related to the order.

At operation 140, information regarding the order is communicated to an order orchestration module 123. Order orchestration module 123 may utilize the order information to orchestrate the provisioning of services and resources for the order placed by the client. In some instances, order orchestration module 123 may orchestrate the provisioning of resources to support the subscribed services using the services of order provisioning module 124.

In certain embodiments, order orchestration module 123 enables the management of processes associated with each order and applies logic to determine whether an order should proceed to provisioning. At operation 142, upon receiving an order for a new subscription, order orchestration module 123 sends a request to order provisioning module 124 to allocate resources and configure those resources needed to fulfill the subscription order. Order provisioning module 124 enables the allocation of resources for the services ordered by the client. Order provisioning module 124 provides a level of abstraction between the cloud services provided by cloud infrastructure system 101 and the physical implementation layer that is used to provision the resources for providing the requested services. Order orchestration module 123 may thus be isolated from implementation details, such as whether or not services and resources are actually provisioned on the fly or pre-provisioned and only allocated/assigned upon request.

At operation 144, once the services and resources are provisioned, a notification of the provided service may be sent to clients on systems 103 and/or agent devices 110 by order provisioning module 124 of cloud infrastructure system 101. At operation 146, the client's subscription order may be managed and tracked by an order management and monitoring module 126. In some instances, order management and monitoring module 126 may be configured to collect usage statistics for the services in the subscription order, such as the amount of storage used, the amount data transferred, the number of users, and the amount of system up time and system down time.

In certain embodiments, cloud infrastructure system 200 may include an identity management module 128. Identity management module 128 may be configured to provide identity services, such as access management and authorization services in cloud infrastructure system 101. In some embodiments, identity management module 128 may control information about clients who wish to utilize the services provided by cloud infrastructure system 101. Such information can include information that authenticates the identities of such clients and information that describes which actions those clients are authorized to perform relative to various system resources (e.g., files, directories, applications, communication ports, memory segments, etc.). Identity management module 128 may also include the management of descriptive information about each client and about how and by whom that descriptive information can be accessed and modified.

Figure 4:
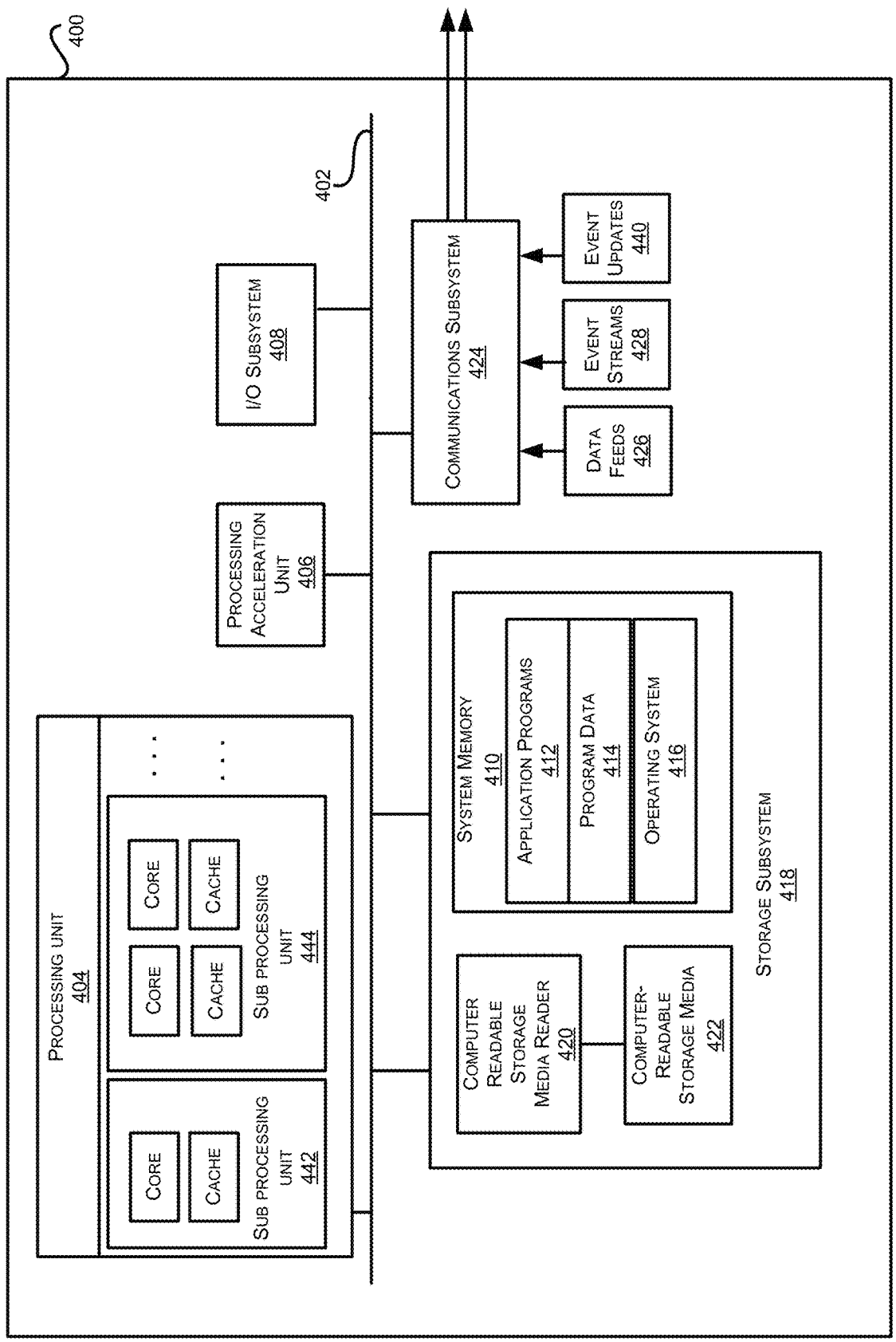
FIG. 4 illustrates an exemplary computer system, in which various embodiments according to the present disclosure may be implemented.

FIG. 4 illustrates an exemplary computer system 400, in which various embodiments according to the present disclosure may be implemented. The system 400 may be used to implement any of the computer systems described herein. As shown in the figure, computer system 400 includes a processing unit 404 that communicates with a number of peripheral subsystems via a bus subsystem 402. These peripheral subsystems may include a processing acceleration unit 406, an I/O subsystem 408, a storage subsystem 418 and a communications subsystem 424. Storage subsystem 418 includes tangible computer-readable storage media 422 and a system memory 410.

Bus subsystem 402 provides a mechanism for letting the various components and subsystems of computer system 400 communicate with each other as intended. Although bus subsystem 402 is shown schematically as a single bus, alternative embodiments of the bus subsystem may utilize multiple buses. Bus subsystem 402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 404, which can be implemented as one or more integrated circuits (e.g., a conventional microprocessor or microcontroller), controls the operation of computer system 400. One or more processors may be included in processing unit 404. These processors may include single core or multicore processors. In certain embodiments, processing unit 404 may be implemented as one or more independent processing units 432 and/or 434 with single or multicore processors included in each processing unit. In other embodiments, processing unit 404 may also be implemented as a quad-core processing unit formed by integrating two dual-core processors into a single chip.

In various embodiments, processing unit 404 can execute a variety of programs in response to program code and can maintain multiple concurrently executing programs or processes. At any given time, some or all of the program code to be executed can be resident in processor(s) 404 and/or in storage subsystem 418. Through suitable programming, processor(s) 404 can provide various functionalities described above. Computer system 400 may additionally include a processing acceleration unit 406, which can include a digital signal processor (DSP), a special-purpose processor, and/or the like. In some embodiments, the processing acceleration unit 406 may include or work in conjunction with an acceleration engine such as that disclosed herein to improve computer system functioning.

I/O subsystem 408 may include user interface input devices and user interface output devices. User interface input devices may include a keyboard, pointing devices such as a mouse or trackball, a touchpad or touch screen incorporated into a display, a scroll wheel, a click wheel, a dial, a button, a database, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 460 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri®), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 400 may comprise a storage subsystem 418 that comprises software elements, shown as being currently located within a system memory 410. System memory 410 may store program instructions that are loadable and executable on processing unit 404, as well as data generated during the execution of these programs. Depending on the configuration and type of computer system 400, system memory 410 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 404. In some implementations, system memory 410 may include multiple different types of memory, such as static random access memory (SRAM) or dynamic random access memory (DRAM). In some implementations, a basic input/output system (BIOS), containing the basic routines that help to transfer information between elements within computer system 400, such as during start-up, may typically be stored in the ROM. By way of example, and not limitation, system memory 410 also illustrates application programs 412, which may include client applications, Web browsers, mid-tier applications, relational database management systems (RDBMS), etc., program data 414, and an operating system 416. By way of example, operating system 416 may include various versions of Microsoft Windows®, Apple Macintosh®, and/or Linux operating systems, a variety of available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 418 may also provide a tangible computer-readable storage medium for storing the basic programming and data constructs that provide the functionality of some embodiments. Software (programs, code modules, instructions) that when executed by a processor provide the functionality described above may be stored in storage subsystem 418. These software modules or instructions may be executed by processing unit 404. Storage subsystem 418 may also provide a repository for storing data used in accordance with the present invention.

Storage subsystem 400 may also include a computer-readable storage media reader 420 that can further be connected to computer-readable storage media 422. Together and, optionally, in combination with system memory 410, computer-readable storage media 422 may comprehensively represent remote, local, fixed, and/or removable storage devices plus storage media for temporarily and/or more permanently containing, storing, transmitting, and retrieving computer-readable information.

Computer-readable storage media 422 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 400.

By way of example, computer-readable storage media 422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 422 may include, but is not limited to, Zip® drives, flash memory cards, universal serial bus (USB) flash drives, secure digital (SD) cards, DVD disks, digital video tape, and the like. Computer-readable storage media 422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 400.

Communications subsystem 424 provides an interface to other computer systems and networks. Communications subsystem 424 serves as an interface for receiving data from and transmitting data to other systems from computer system 400. For example, communications subsystem 424 may enable computer system 400 to connect to one or more devices via the Internet. In some embodiments communications subsystem 424 can include radio frequency (RF) transceiver components for accessing wireless voice and/or data networks (e.g., using cellular telephone technology, advanced data network technology, such as 4G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 424 can provide wired network connectivity (e.g., Ethernet) in addition to or instead of a wireless interface.

In some embodiments, communications subsystem 424 may also receive input communication in the form of structured and/or unstructured data feeds 426, event streams 428, event updates 430, and the like on behalf of one or more users who may use computer system 400. By way of example, communications subsystem 424 may be configured to receive data feeds 426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 424 may also be configured to receive data in the form of continuous data streams, which may include event streams 428 of real-time events and/or event updates 430, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like. Communications subsystem 424 may also be configured to output the structured and/or unstructured data feeds 426, event streams 428, event updates 430, and the like to one or more databases that may be in communication with one or more streaming data source computers coupled to computer system 400.

Computer system 400 can be one of various types, including a handheld portable device (e.g., an iPhone® cellular phone, an iPad® computing tablet, a PDA), a wearable device (e.g., a Google Glass® head mounted display), a PC, a workstation, a mainframe, a server rack, or any other data processing system. Due to the ever-changing nature of computers and networks, the description of computer system 400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Various methods described herein may be implemented by a computer system, such as computer system 400. Each step of these methods may be executed automatically by the computer system 400. In various embodiments, some steps may be provided with inputs/outputs involving a user. For example, a user may provide inputs for each step in a method, and each of these inputs may be in response to a specific output requesting such an input, wherein the output is generated by the computer system 400. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. Furthermore, some embodiments of each of the methods described herein may be implemented as a set of instructions stored on a tangible, non-transitory storage medium to form a tangible software product.

Figure 5:
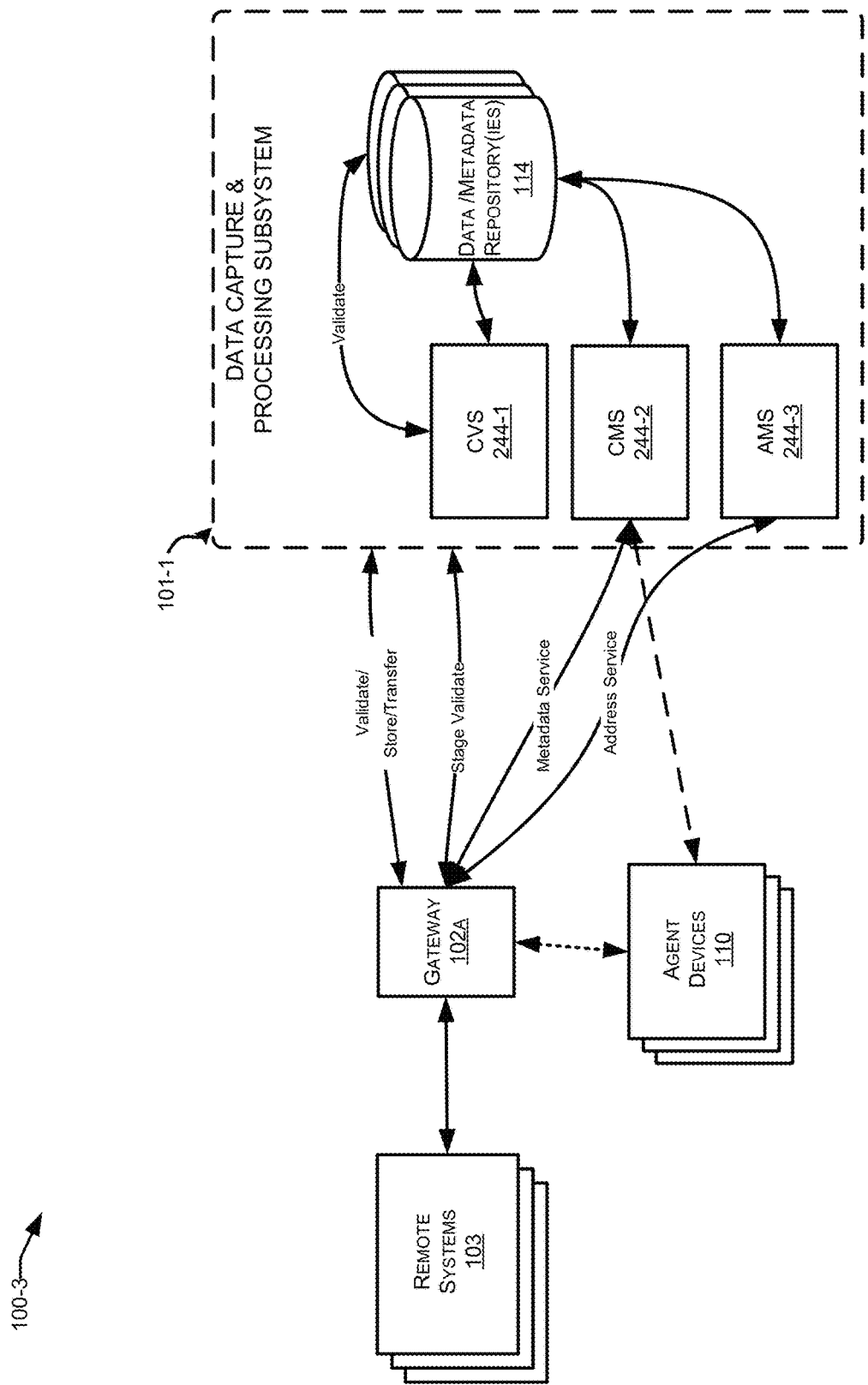
FIG. 5 illustrates a functional flow diagram for various embodiments of the network to facilitate adaptive data security and cooperative multi-system operations in conformance with dynamic protocols, in accordance with the present disclosure.
Figure 6:
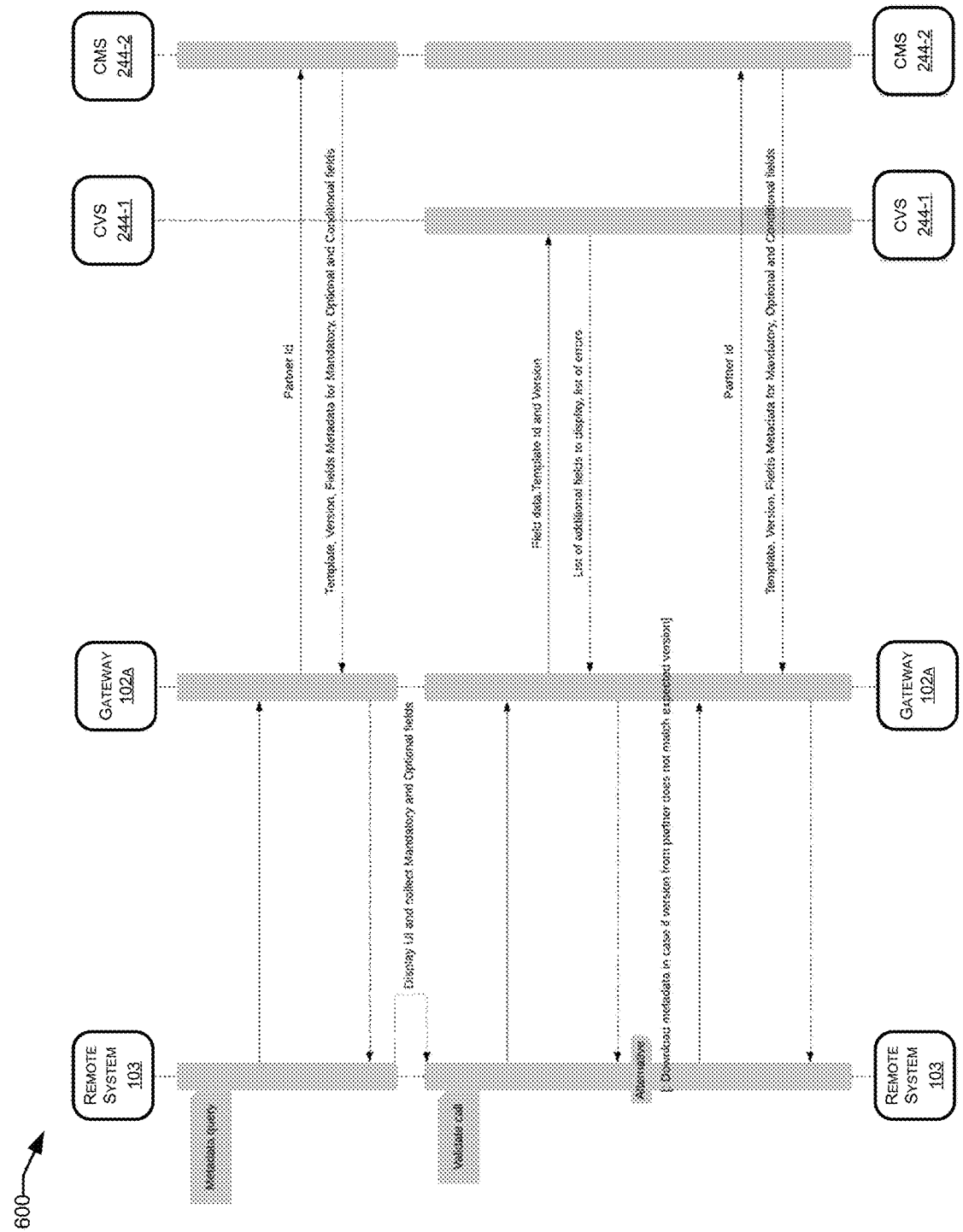
FIG. 6 illustrates a sequence flow diagram for various embodiments of the network to facilitate adaptive data security and cooperative multi-system operations in conformance with dynamic protocols, in accordance with the present disclosure.

FIG. 5 illustrates a functional flow diagram for various embodiments of the network 100 to facilitate adaptive data security and cooperative multi-system operations in conformance with dynamic protocols, in accordance with the present disclosure. FIG. 6 illustrates a sequence flow diagram for various embodiments of the network 100 to facilitate adaptive data security and cooperative multi-system operations in conformance with dynamic protocols, in accordance with the present disclosure.

The system 101 may support cooperative multi-system operations of the one or more remote systems 103, one or more endpoint devices 106, and/or one or more agent devices 110. Various embodiments of networks 100 may be implemented and configured to perform secure transfers between one or more endpoint devices 106, agent devices 110, service provider systems 103, and/or system 101, with the system 101 coordinating operations of the endpoint devices 106, agent devices 110, and/or service provider systems 103 in conformance with dynamic protocols. In some embodiments, one or more of the systems 103, agent devices 110, and/or system 101 may be configured to provide secure transfers to the other components of the network 100. Secure transfers may include transfers of one or a combination of various, different types of data items, credentials, codes, authorizations, services, requests, files, database records, content, resources, and/or the like. In some embodiments, the network 100 may be configured to operate as a resource transfer and/or access system by which users at endpoint devices 106 may initiate resource transfers and/or grant access to resources (e.g., one or more media of exchange) to one or a combination of systems 103, system 101, and/or users at other endpoint devices 106 in different locations, on different networks, and/or in different datacenters, etc. In some instances, an endpoint device 106 may cause a first secure transfer via a first system 103 that, in turn, causes one or more additional secure transfers via one or more additional systems 103. The system 101 may be configured to dynamically support, and ensure data security and integrity, of the secure transfers and other interactions of the service provider system 103 with the endpoint devices 106 and/or agent devices 110. In some embodiments, the system 101 may coordinate cooperative multi-system operations, via the one or more networks 120, of the service provider system 103 with the endpoint devices 106 and/or agent devices 110 that involve changing events, different endpoint devices 106 and/or agent devices 110 at different locations, changing accesses to resources, different service requests and service provisioning, etc., to ensure data security and integrity in conjunction therewith. The system 101 may provide data services 244 and implement an adaptable and dynamic API (application programming interface) to facilitate cooperative multi-system operations with the changing needs and contexts of the service provider system 103, endpoint devices 106, and/or agent devices 110—without requiring changes to hardcoding, changes to templates, creation of new templates, or reconfiguring of the systems 103, which would be too numerous, time-consuming, and otherwise resource-consuming to support the different types of sessions, transfers, devices, systems, locations, and requirements that are supported by disclosed embodiments. By avoiding such changes to hardcoding, templates, and configurations, disclosed embodiments may provide for significant technological improvements in speed, flexibility, adaptability, and applicability of operations and functioning of systems and devices. Disclosed embodiments solve problems of conventional systems and devices being relatively slow, inflexible, and monolithic for secure transfers.

In various embodiments, the dynamic services 244 provided by the system 101 and the operations of the system 101 according to the API, for each individual session related to one or more secure transfers, may be a function of one or a combination of one or more locations of the one or more endpoint device 106, one or more locations of the one or more remote systems 103, one or more locations of the one or more agent devices 110, one or more types of the remote systems 103, one or more requirements of the one or more remote systems 103, one or more types of the one or more secure transfers, one or more parameters and/or parameter values of the one or more secure transfers, and/or the like. The system 101 may have the ability and flexibility to request data through the dynamic API and change rules and requirements in real time, on a per-session basis.

The dynamic services 244 provided by the system 101 may include data collection and data integrity services 244. In some embodiments, the system 101 may implement the dynamic services 244 with an application, which may or may not be a standalone application in various embodiments. In various embodiments, the dynamic services 244 may be based at least in part on micro-services architecture and may be described using Swagger. In various embodiments, may be implemented as a cloud-enabled service (e.g., Restful Web service and/or the like) provided by the system 101 which can be accessed directly by the service provider systems 103, for example, via the gateway 102A and/or the server(s) 102. For example, the services 244 may be architected as a REST service interface that describes a collection of methods, available over the one or more networks 120 and working using JOSN/XML, messages. With REST services, the application allows other applications to interact with its methods. The dynamic services 244 may enable frontend applications of the remote systems 103, agent devices 110, and/or endpoint device 106 to paint the screen for collecting information based on a centralized configuration provided by the system 101. New entry fields may be introduced in real time during a session, without code changes on a front end and pass-through systems such as the gateway 102A.

The dynamic services API may be defined in OpenAPI Specification (OAS) or another industry standard which allows client applications to discover and understand the capabilities of the service without access to source code, documentation, or through network traffic inspection. In various embodiments, the dynamic API may support and define a plurality of services which may be implemented in a single micro service. For example, the dynamic API may support and define a compliance validate service (CVS) 244-1, a compliance metadata service (CMS) 244-2, and/or an address metadata service (AMS) 244-3 which may be implemented in a single micro service. One or a combination of such services 244 may use the metadata repository 114.

To facilitate the dynamic data services, the system 101 may create a set of metadata specifications that include a plurality of data element definitions. The metadata specifications and data element definitions may specify information that may be used to determine whether resource access is to be granted, as well as additional constraints required depending on the context of a particular transaction and/or session, and a variety of factors, including locations of the service provider system 103, endpoint devices 106 and/or agent devices 110 at the time of the session. In some embodiments, the metadata specifications and data element definitions may correspond to a data dictionary and may be referenced herein as such. In various embodiments, the metadata specifications and data element definitions may be created and stored with data structures (which may correspond to a data dictionary in some embodiments) corresponding to one or more indexes, trees, arrays, matrices, and/or the like. The data structures may hierarchically order the plurality of data element definitions. Such a hierarchy could be a tree hierarchy with some embodiments. The ordering thereof may allow a remote system 103 and/or an agent device 110 to traverse the data structure. In some embodiments, metadata specifications may specify at least some transitional relationships between at least some of the data element definitions. In various embodiments, indexing to facilitate data structures disclosed herein may be by way of specifications, links, and/or pointers or other references. In some embodiments, the metadata specifications and data element definitions may be adapted to particular systems 103. For example, each data dictionary adapted to a particular system 103 may include metadata specifications and data element definitions to support specific, unique, and/or customized requirements of the particular system 103.

The metadata repository 114 may store a superset of compliance data elements. In some embodiments, the metadata repository 114 may correspond to a centralized system to maintain data about compliance template data elements and template composition (e.g., metadata specifications). In some embodiments, the metadata repository 114 may be implemented with a distributed system, as disclosed herein. The metadata repository 114 may maintain versioning with respect to new additions of data elements into the system 101. The metadata repository 114 may maintain the compliance specification in the form of a list of data elements at various entity level like country/network/agent/product, etc. The metadata repository 114 may contain the super set of all the fields and its attributes in the form of object notation. The metadata repository 114 may also have count-/agent-specific rules defined in containers. The metadata repository 114 may provide the ability for the agent devices 110 to fully render a compliance template via CMS 244-2, which may include, for example, order, type (e.g., list, input, radio), label (e.g., language), minimum length, maximum length required, etc. The metadata repository 114 may provide for display values for dropdown interface elements and respective host values. The metadata repository 114 may also provide for multi-language support for the labels/display values. The metadata repository 114 may include such data from manifold data sources in various forms, with the sources including regulatory information, client-specific information, and the like.

The system actions of the system 101 may include collecting and processing regulatory requirements and client-specific requirements, adapting to changing compliance requirements, and developing compliance protocols, specifications of interface elements, and/or the like to adapt the metadata specifications and data element definitions to support specific, unique, and/or customized requirements of particular systems 103. Accordingly, metadata specifications and data element definitions transmitted to a particular system 103 and/or agent device 110 may be adapted to facilitate secure transfers, where parameters of each secure transfer may change depending on one or more locations of the one or more endpoint devices 106, one or more locations of the remote system 103, one or more locations of the agent device 110, one or more types of the remote system 103, one or more requirements of the remote system 103, one or more types of the secure transfer, one or more parameters and/or parameter values of the secure transfer, and/or the like. To facilitate the collection and processing of regulatory requirements and client-specific requirements and updates thereto, the system 101 may include one or more harvesting engines that may include logic for implementing information aggregation features in various embodiments. In some embodiments, the harvesting engine may be configured to gather data about regulatory requirements and/or client-specific requirements from one or more data sources, which may include one or more systems 103, through the one or more networks 120. By way of example without limitation, the engine(s) with one or more the processors, may utilize one or more network interfaces to pull and/or push code and or other data from various entities. In some embodiments, data may be actively gathered by accessing a repository that corresponds to those entities. Data could be gathered by "crawling" the various repositories in some embodiments. Updates for repositories may be periodically found. With some embodiments, any one or combination of the data sources may provide notifications to the system 101 of data to be transferred, such as updated regulatory information and/or client-specific requirements not previously pulled/pushed to the system 101. Certain embodiments may also include data being pre-loaded and/or directly transferred to the system 101 (e.g., via a storage medium) in addition to or in lieu of transferring data via a network 120. The harvesting engine could handle processing, extracting, formatting, and/or storing in information repositories 114 data including data for the system 101 to adapt the data dictionaries for one or more particular systems 103. The harvested data may then be analyzed to determine one or more attributes of the code and/or other data to determine and adapt to the new, updated, and/or otherwise changed regulatory and/or client-specific requirements.

The system 101 may include a may include a matching engine configured to classify code portions and/or other data into at least one category of a set of categories that represent classifications based at least in part on one or more sets of attributes defined for classifying code. In various embodiments, the attributes may correspond to any one or combination of keywords, characterizations, code identifiers (e.g., numerical and descriptive sectional headings and subheadings), location identifiers, source identifiers (e.g., for the source of code portions acquired), code hierarchical indicia (e.g., chapter, section, subsection, etc.), and/or the like corresponding to classification bases disclosed herein. For example, information with respect to a particular code portion may be analyzed in order to identify one or more code attributes, and the one or more code attributes may be matched to attributes defined for certain categories. The matching engine can receive a code portion, identify attributes of the code portion, and match the code portion to one or more categories based on category information retained in the repository 114. The code portion may be matched to one or more categories that each represent classifications of code portions sharing common attributes. The matching engine may be or include a classification engine configured to classify each code portion into at least one category of a set of categories that represent classifications of the code portions based at least in part on one or more sets of attributes defined for classifying various code requirements. In some embodiments, one or more taxonomies that map keywords of particular code portions to particular categories may be used in correlating code portions with one or more categories. Accordingly, certain embodiments may employ keyword analysis of the code portions and map the code portions to one or more categories based at least in part on the mapping and keywords recognized. By way of example, the categories may represent categorization of code according to sources of the code (e.g., a particular system 103). The sources of the code could correspond to the regulating authority promulgating the code. The sources could be categorized according to location (e.g., federal, state, and/or local). The code portion could be classified according to location, for example, a state, county, and/or municipality to which the code portion applies. In some cases, a location to which the code portion applies may be determined at least in part by the regulatory authority promulgating the code portion. In addition or in alternative, a location to which the code portion applies may be determined at least in part by inferring the location from keyword analysis of the code portion and/or a larger body of code including the code portion. The code portion could be linked to one or more location identifiers (e.g., states, county, and/or municipality identifiers; geo coordinates corresponding to the location; and/or the like). Using the classifications and the output of the matching engines, the system 101 may update a previously created set of metadata specifications for a particular system 103 or may create a new set of metadata specifications for the particular system 103. As disclosed herein, various embodiments may allow for adapting the requirements and corresponding metadata specifications for a particular system 103 in real-time or near real-time, and may further allow for implementing the change requirements with a corresponding change metadata specifications during a session.

Referring again to FIGS. 5 and 6, the system 101 may cause transmission of a set of metadata specifications via one or more networks 120 to each remote system 103 of a plurality of remote systems 103. Likewise, the system 101 may cause transmission of a set of metadata specifications via one or more networks 120 to each agent device 110. The system 101 may subsequently provide one or more features, such the following. Data collection requirements may be configured using a hierarchal structure (e.g., geolocation/region, network, agent, etc.). The protocols may support triggering of cache refresh of metadata specifications at a client side. Frontend validations may be performed based at least in part on centralized metadata, in addition to backend validations. Multiple errors may be returned at one time, so the frontend can collect, correct, and re-submit in one go. The system 101 may further provide the ability to configure a template, which may be based on another template in some embodiments. The system 101 may further provide the ability to configure custom hierarchies for selecting template. The system 101 may also pre-populating data on screen. These and other features are disclosed further herein.

In some embodiments, transmissions of metadata specifications may be in response to metadata queries. In some embodiments, the system 101 may determine from the one or more metadata queries attributes of the system 103 and corresponding requests, such as language identifiers, agent IDs, product identifiers, send/transfer identifiers, and/or the like. The agent devices HO and/or service provider systems 103 may import and cache the metadata specifications using CMS 244-2. In various embodiments, the metadata specifications may be transmitted to the agent devices 110 and/or service provider systems 103 on a periodic basis (e.g., once a day, hour, etc.) and/or on demand. In some embodiments, the metadata specifications may be transmitted to a particular agent device 110 and/or service provider system 103 along with the particular transaction on an ad-hoc basis. In such instances, the particular agent device 110 and/or service provider system 103 may only cache the metadata specifications for the particular transaction or a particular number of transactions and/or sessions.

In various embodiments, the agent devices 110 may use the metadata specifications to create new policies, configurations, and/or corresponding container registries at terminal level to enable dynamic compliance collection per transaction. Likewise, in some embodiments, the systems 103 may use the metadata specifications to create new policies, configurations, and/or corresponding container registries to enable dynamic compliance collection per transaction.

The agent devices 110 and/or service provider systems 103 may send new dynamic compliance collection flag in validate (hold) request to the host (system 101). The agent devices 110 and/or service provider systems 103 may send indicators that they are enabled for dynamic compliance collection along with compliance template type and version in calls to the host. The system 101 may maintain template version number by agent/terminal identifier in the repository 114. On validate (hold), the system 101 may throw compliance error along with identifiers of fields (e.g., comma separated fields names) that need to be displayed and data captured on the agent devices 110 and/or service provider systems 103. The agent devices 110 and/or service provider systems 103 may fetch field attributes from local metadata specifications (e.g., cached) and prepare dynamic list of fields and display on screen. The agent devices 110 and/or service provider systems 103 may perform basic data validation like blank, date, numeric, min, max etc. per metadata specifications returned as part of one or more CMS 244-2 calls. The agent devices 110 and/or service provider systems 103 may capture data and send in data elements back to the host in re-validate (hold) call.

In some embodiments, the CMS 244-2 may provide the remote systems 103 and/or agent devices 110 with metadata specifications that may be specific to templates (i.e., details on which template will have what fields and in what order for data collection purposes). The remote systems 103 and/or agent devices 110 may access the service periodically (e.g., once a day, once an hour, etc.) and/or on-demand to sync up metadata at their end, which would later be used for laying out remote system 103 and/or agent device 110 screens dynamically as part of data collection. As illustrated, the dynamic services 244 may be accessed through API gateway either via the gateway 102A and/or directly by client.

In various embodiments, the CVS 244-1 may correspond to a centralized compliance data collection and validation service that may be accessed directly by the client, through the gateway 102A. All validate/send/transfer requests may be sent to the system 101, which would make one or more calls to the service for compliance validation. The CVS service 244-1 may perform one or a combination of operations such as following. The CVS service 244-1 may identify the template configuration which needs to be applied for a current transaction. At any point, only one configuration may be picked for a given transaction in some embodiments. The identification of template configuration may be based at least in part on account number, network identifier, location, and/or the like. The account level configuration may take high precedence over network and country, and network may override country configuration. The CVS service 244-1 may validate that template configuration (e.g., type and version) from transaction matches with configuration assigned in the repository 114. The CVS service 244-1 may return an error code/message (advisory—e.g., R0002 template mismatch, advised to resync metadata repository), upon determining a mismatch and may allow a current transaction to complete when the template type/version are in allowed versions list. The CVS service 244-1 may ensure that template configuration (e.g., type and version) from the current transaction matches with the configuration defined in repository 114. The CVS service 244-1 may returns below an error code/message (e.g., R0001 Template mismatch, Resync with Metadata Repository to proceed transaction) when the template type and/or version are not supported by the system 101. In such case, the system may determine that the system 103 and/or agent device 110 require resyncing of the metadata specifications, and the system may transmit the updated template configuration to complete the transaction. The template assignment/rollout may be managed by the CMS 244-2 and can be at account, network, and/or country level. The CVS service 244-1 may ensure that the current transaction carries all required data element and validates basic data integrity checks as the per configuration. The CVS service 244-1 may send one or more error codes/messages (refer ErrorDetail structure) upon any validation fails with the below information.

As disclosed herein, the dynamic API may include metadata specifications in the form of a data structure (e.g., an index, tree, and/or the like) which may be transmitted to clients in any suitable form (e.g., files, documents, etc.). The data structure may correspond to a data dictionary that specifies data element definitions. For particular data element, the specifications may specify all information needed to render that element on screen. For example, this may include specifying interface elements for data fields, such as dropdown menus, any text, image, and/or device that can be displayed on a display screen for providing information to a user and/or for receiving user input, and may include one or more widgets, windows, dashboards, text, text boxes, text fields, tables, grids, charts, hyperlinks, buttons, lists, combo boxes, checkboxes, radio buttons, and/or the like. The specifications may further specify types of data requiring collection and if there any data dependencies.

After the system 101 has transmitted the metadata specifications to a remote system 103 and/or agent device 110, the system 101 may facilitate subsequent adaptive data security and cooperative multi-system operations in conformance with dynamic protocols. The system 101 may detect one or more system interactions that corresponds to a defined event. The defined event may correspond to a device interaction or data change caused with respect to the at least one remote system 103 and a particular endpoint device 106. In an example session, an endpoint device 106 and/or agent device 110 may, for example, submit a set of one or more access requests to a system 103 as part of a particular session where one or more transfers are initiated. A service provider system 103 may be configured to receive and respond to requests from endpoint devices 106 and/or agent devices 110 as part of a particular session where one or more transfers are initiated. For example, the service provider system 103 may be configured to receive requests (e.g., in HTTP(s), REST, or another suitable protocol) from an endpoint device 106 or agent device 110 and respond with webpage data or mobile app data. Various instances of the set of one or more access requests may include credentials, codes, and/or verification information that may be used to determine whether resource access is to be granted, but additional constraints may be required depending on the context and a variety of factors, including locations of the service provider system 103, endpoint devices 106 and/or agent devices 110. The additional constraints may require additional data and data verification operations for particular access requests, transfers, and sessions. At the time of the transaction and/or session, the service provider system 103 may, in turn, transmit one or more requests to the system 101, along with self-identification and one or more identifiers of the use case. Thus, in the subsequent session, the protocol allows for the system 101 to determine the contour of the session and the secure transfers requested within the session, where the contour is determined correspond to a defined event.

The CMS 244-2 may adapt to the use case to collect the data points needed. The system 101 may identify a protocol that includes parameter constraints mapped to the defined event. For example, the system 101 may look up the protocol for the particular service provider system 103, including which metadata (e.g., data types, fields, type of field such as numeric field, field lengths, rules, special character prohibitions, particular expressions, etc.) are appropriate for particular service provider system 103 and the transaction(s). The system 101 may generate an implementation of the protocol, the implementation of the protocol defined an operation flow that is to occur in response to the detection of the defined event. The implementation of the protocol may transform the protocol into an executable process that applies to the remote system 103.

The system 102 may identify one or more process definitions as a function of the defined event and may retrieve the one or more process definitions from the repository 114. The system 102 may generate the implementation of the protocol may be based at least in part on the one or more process definitions. The protocol may provide for dependency (cascading) rules. For example, if a certain zip code is collected, then another piece of information may need to be collection. As another example, if an identifier is collected and the identifiers determined to correspond to a passport number, then an expiration date for the passport number needs to be also collected. However, if a social security number is collected as the identifier, then there is no need to collect an expiration date as social security numbers do not expire. As another example of adapting to changes in requirements with dynamic data collection capabilities, the protocol and CMS 244-2 may dynamically adapt to changing types and values of transfers and may send references to different metadata specifications that are a function of the type of transfer and/or the value of the transfer. Such adaptation may be performed in real-time or near real-time mode, during the transaction session with the remote system 103.

The operation flow may include the system 101 transmitting to the remote system 103 references to a first subset of the set of metadata specifications (e.g., references to portions of the data dictionary) previously transmitted to the system 103, as part of the CMS 244-2. This may include giving pointers within the API of which data elements the system 101 needs to collect for the particular defined event (e.g., transaction(s)/session). For example, such references may instruct the service provider system 103 to paint with interface elements corresponding to five data elements needing to be collected on the screen (e.g., provide content to allow for the rendering of the five interface elements on the screen of the endpoint device 106), and user of the endpoint device 106 may then provide input for just those five data in elements and submit the transaction. In this manner, nothing irrelevant to the targeted data collection need be provided to the system 103 and/or endpoint device 106 (in contrast to the conventional methods with templates which would require superfluous data elements collections and corresponding communications). The system 101 may receive, from the system 103, responses to the transmitting of the references, the responses including data collected by the system 103 in conjunction with the defined event (e.g., data at least partially collected from the endpoint device 106).

The transaction may be then allowed to go through in accordance with validation processes disclosed herein. The system 101 may determine whether the responses conform to the parameter constraints of the protocol. Upon determination that the responses satisfy the parameter constraints, system 101 may control access of the system 103 (or an agent system) to a resource in accordance with the protocol. However, the system 101 may determine that the responses fail to satisfy the parameter constraints. In some instances, this may include the system 101 identifying a data dependency specified by the protocol that is triggered by one or more data elements received with one or more of the responses. The system 101 may determine a second subset of the set of metadata specifications based at least in part on the data dependency. In some instances, system 101 may request missing data in the transaction authentication process and trigger a function on system 103 to collect additional data at specific points within transaction flow. Thus, for example, upon determination that the responses fail to satisfy the parameter constraints, the system 101 may transmit an alert to the system 103 that is indicative of at least one of the references and/or one or more additional references to a second subset of the set of metadata specifications.

In various aspects, disclosed embodiments of the adaptive system 101 may provide for creation, population, completion, and acceleration of documentation processes based on each session. With some examples, the system 101 (via one or more bots/agents, which may be instantiated for each system 103 and/or session and may be configured to monitor for communications and responses from particular remote systems 103, orchestrate and/or otherwise implement one or a combination of the dynamic API features disclosed herein from the system 101 side) may create, populate, complete, and accelerate documentation based on each session. A documentation acceleration bot may apply rules that define what type of documentation is required for different sessions/transactions. With each data collection operation, the system 101 may store in a data log (e.g., an repository 114) mapped to the particular remote system 103, agent device 110, user, and/or endpoint device 106 the data collected by the system 101 with the one or more responses from the remote system 101 and/or agent device 110. The system 101 may further generate a content composite with the data collected. This real-time data composite creation may facilitate the generation compliance reports by the system 101, along with document population features—in conformance with requirements that may be different for every country, and/or system 103 that is involved in the session. The compliance reports may be in the form of XML, system file over FTP, CSV files, event service calls, and/or the like. To that end, the system 101 may populate one or more tables in the repository 114 with documentation specifications. The documentation specifications may specify particular document attributes that are required by the specific requirements identified for the session as a function of the country, and/or system 103 that is involved in the session and the rules corresponding to the country, and/or system 103. The system 101 may generate objects to facilitate setup of a program to generate the documents. The system 101 may populate the objects with specifications of the session/transaction as required by the rules in conformance to the particular document attributes. The system 101 may store the objects in association with the program.

In some embodiments, the interfaces disclosed herein may include one or more APIs that define protocols and routines for interfacing with the data sources. The APIs may specify API calls to/from data source systems. In some embodiments, the APIs may include a plug-in to integrate with an application of a data source system. The interfaces, in some embodiments, could use a number of API translation profiles configured to allow interface with the one or more additional applications of the data sources to access data (e.g., a database or other data store) of the data sources. The API translation profiles may translate the protocols and routines of the data source system to integrate at least temporarily with the system and allow communication with the system by way of API calls. Data, as referenced herein, may correspond to any one or combination of raw data, unstructured data, structured data, information, and/or content which may include media content, text, documents, files, instructions, code, executable files, images, video, audio, and/or any other suitable content suitable for embodiments of the present disclosure.

The above methods may be implemented by computer-program products that direct a computer system to control the actions of the above-described methods and components. Each such computer-program may comprise sets of instructions (codes) embodied on a computer-readable medium that directs the processor of a computer system to cause corresponding actions. The instructions may be configured to run in sequential order, or in parallel (such as under different processing threads), or in a combination thereof. Special-purpose computer systems disclosed herein include a computer-program product(s) stored in tangible computer-readable memory that directs the systems to perform the above-described methods. The systems include one or more processors that communicate with a number of peripheral devices via a bus subsystem. These peripheral devices may include user output device(s), user input device(s), communications interface(s), and a storage subsystem, such as random-access memory (RAM) and non-volatile storage drive (e.g., disk drive, optical drive, solid state drive), which are forms of tangible computer-readable memory.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the terms "storage medium," "storage media," "computer-readable medium," "computer-readable media," "processor-readable medium," "processor-readable media," and variations of the term may represent one or more devices for storing data, including read only memory (ROM), random access memory (RAM), magnetic RAM, core memory, magnetic disk storage mediums, optical storage mediums, flash memory devices and/or other machine readable mediums for storing information. The terms, computer-readable media, processor-readable media, and variations of the term, include, but are not limited to portable or fixed storage devices, optical storage devices, wireless channels and various other mediums capable of storing, containing or carrying instruction(s) and/or data.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

While the principles of the disclosure have been described above in connection with specific apparatuses and methods, it is to be clearly understood that this description is made only by way of example and not as limitation on the scope of the disclosure. Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Furthermore, while the figures depicting mechanical parts of the embodiments are drawn to scale, it is to be clearly understood as only by way of example and not as limiting the scope of the disclosure.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

While the principles of the disclosure have been described above in connection with specific apparatuses and methods, it is to be clearly understood that this description is made only by way of example and not as limitation on the scope of the disclosure.

What is claimed:

1. A system comprising:
   one or more processing devices; and
   a non-transitory, computer-readable storage medium storing instructions which, when executed by the one or more processing devices, cause the one or more processing devices to perform operations comprising:
      identifying a first set of metadata specifications that comprise a plurality of data element definitions;
      transmitting the first set of metadata specifications to a remote system;
      for the remote system, performing an operation flow that is to occur in response to a detection at the remote system of a defined event, the operation flow comprising:
         transmitting, to the remote system, one or more references to a first subset of the first set of metadata specifications, where the first subset of the first set of metadata specifications comprises specifications of interface elements, and the transmitting the one or more references causes the remote system to configure an interface in accordance with the specifications of interface elements;
         receiving, from the remote system, one or more responses to the transmitting of the one or more references, the one or more responses comprising data collected by the remote system in conjunction with the defined event; and
         upon determination that the one or more responses satisfy a set of one or more parameter constraints, controlling access of the remote system or an agent system to a resource in accordance with a protocol, or, upon determination that the one or more responses fail to satisfy the set of one or more parameter constraints, transmitting an alert to the remote system that is indicative of at least one of the one or more references and/or one or more additional references to a second subset of the first set of metadata specifications; and
      subsequent to the performing of the operational flow, changing requirements corresponding to one or more subsequent operational flows based at least in part on transmitting a second set of metadata specifications or one or more references to a third subset of the first set of metadata specifications to the remote system.

2. The system as recited in claim 1, the operations further comprising:
   for the remote system, performing at least one operation flow of the one or more subsequent operational flows, the at least one operation flow comprising:
      transmitting, to the remote system, one or more references to a first subset of the second set of metadata specifications, where the first subset of the second set of metadata specifications comprises second specifications of interface elements, and the transmitting the one or more references causes the remote system to configure an interface in accordance with the second specifications of interface elements;
      receiving, from the remote system, one or more responses to the transmitting of the one or more references to the first subset of the second set of metadata specifications; and
      determining whether the one or more responses to the transmitting of the one or more references to the first subset of the second set of metadata specifications satisfy the set of one or more parameter constraints or a different set of one or more parameter constraints.

3. The system as recited in claim 2, where:
   the at least one operation flow of the one or more subsequent operational flows is to occur in response to a subsequent detection at the remote system of the defined event; and
   the one or more responses to the transmitting of the one or more references to the first subset of the second set of metadata specifications comprise data collected by the remote system in conjunction with the defined event.

4. The system as recited in claim 2, where the operations further comprise:
   upon a determination that the one or more responses to the first subset of the second set of metadata specifications satisfy the set of one or more parameter constraints or the different set of one or more parameter constraints, controlling access of the remote system or the agent system to the resource or a different resource; or
   upon a determination that the one or more responses to the first subset of the second set of metadata specifications fail to satisfy the set of one or more parameter constraints or the different set of one or more parameter constraints, transmitting another alert to the remote system.

5. The system as recited in claim 1, the operations further comprising:
for the remote system, performing at least one operation flow of the one or more subsequent operational flows, the at least one operation flow comprising:
transmitting, to the remote system, one or more references to the third subset of the first set of metadata specifications, where the third subset comprises second specifications of interface elements, and the transmitting the one or more references causes the remote system to configure an interface in accordance with the second specifications of interface elements;
receiving, from the remote system, one or more responses to the transmitting of the one or more references to the third subset; and
determining whether the one or more responses to the transmitting of the one or more references to the third subset satisfy the set of one or more parameter constraints or a different set of one or more parameter constraints.

6. The system as recited in claim 5, where the operations further comprise:
upon a determination that the one or more responses to the third subset satisfy the set of one or more parameter constraints or the different set of one or more parameter constraints, controlling access to the resource or a different resource; or
upon a determination that the one or more responses to the third subset fail to satisfy the set of one or more parameter constraints or the different set of one or more parameter constraints, transmitting another alert to the remote system.

7. The system as recited in claim 1, where the determination is that the one or more responses fail to satisfy the set of one or more parameter constraints, and the operation flow further comprises:
identifying a data dependency specified by the protocol that is triggered by one or more data elements received with at least one of the one or more responses; and
determining the second subset of the first set of metadata specifications based at least in part on the data dependency.

8. A method comprising:
identifying a first set of metadata specifications that comprise a plurality of data element definitions;
transmitting the first set of metadata specifications to a remote system;
for the remote system, performing an operation flow that is to occur in response to a detection at the remote system of a defined event, the operation flow comprising:
transmitting, to the remote system, one or more references to a first subset of the first set of metadata specifications, where the first subset of the first set of metadata specifications comprises specifications of interface elements, and the transmitting the one or more references causes the remote system to configure an interface in accordance with the specifications of interface elements;
receiving, from the remote system, one or more responses to the transmitting of the one or more references, the one or more responses comprising data collected by the remote system in conjunction with the defined event; and
upon determination that the one or more responses satisfy a set of one or more parameter constraints, controlling access of the remote system or an agent system to a resource in accordance with a protocol, or, upon determination that the one or more responses fail to satisfy the set of one or more parameter constraints,
transmitting an alert to the remote system that is indicative of at least one of the one or more references and/or one or more additional references to a second subset of the first set of metadata specifications; and
subsequent to the performing of the operational flow, changing requirements corresponding to one or more subsequent operational flows based at least in part on transmitting a second set of metadata specifications or one or more references to a third subset of the first set of metadata specifications to the remote system.

9. The method as recited in claim 8, further comprising:
for the remote system, performing at least one operation flow of the one or more subsequent operational flows, the at least one operation flow comprising:
transmitting, to the remote system, one or more references to a first subset of the second set of metadata specifications, where the first subset of the second set of metadata specifications comprises second specifications of interface elements, and the transmitting the one or more references causes the remote system to configure an interface in accordance with the second specifications of interface elements;
receiving, from the remote system, one or more responses to the transmitting of the one or more references to the first subset of the second set of metadata specifications; and
determining whether the one or more responses to the transmitting of the one or more references to the first subset of the second set of metadata specifications satisfy the set of one or more parameter constraints or a different set of one or more parameter constraints.

10. The method as recited in claim 9, where:
the at least one operation flow of the one or more subsequent operational flows is to occur in response to a subsequent detection at the remote system of the defined event; and
the one or more responses to the transmitting of the one or more references to the first subset of the second set of metadata specifications comprise data collected by the remote system in conjunction with the defined event.

11. The method as recited in claim 9, further comprising:
upon a determination that the one or more responses to the first subset of the second set of metadata specifications satisfy the set of one or more parameter constraints or the different set of one or more parameter constraints, controlling access of the remote system or the agent system to the resource or a different resource; or
upon a determination that the one or more responses to the first subset of the second set of metadata specifications fail to satisfy the set of one or more parameter constraints or the different set of one or more parameter constraints, transmitting another alert to the remote system.

12. The method as recited in claim 8, further comprising:
for the remote system, performing at least one operation flow of the one or more subsequent operational flows, the at least one operation flow comprising:
- transmitting, to the remote system, one or more references to the third subset of the first set of metadata specifications, where the third subset comprises second specifications of interface elements, and the transmitting the one or more references causes the remote system to configure an interface in accordance with the second specifications of interface elements;
- receiving, from the remote system, one or more responses to the transmitting of the one or more references to the third subset; and
- determining whether the one or more responses to the transmitting of the one or more references to the third subset satisfy the set of one or more parameter constraints or a different set of one or more parameter constraints.

13. The method as recited in claim 12, further comprising:
upon a determination that the one or more responses to the third subset satisfy the set of one or more parameter constraints or the different set of one or more parameter constraints, controlling access to the resource or a different resource; or
upon a determination that the one or more responses to the third subset fail to satisfy the set of one or more parameter constraints or the different set of one or more parameter constraints, transmitting another alert to the remote system.

14. The method as recited in claim 8, where the determination is that the one or more responses fail to satisfy the set of one or more parameter constraints, and the operation flow further comprises:
- identifying a data dependency specified by the protocol that is triggered by one or more data elements received with at least one of the one or more responses; and
- determining the second subset of the first set of metadata specifications based at least in part on the data dependency.

15. One or more non-transitory, computer-readable media storing instructions, which, when executed by one or more processing devices, cause the one or more processing devices to perform operations comprising:
- identifying a first set of metadata specifications that comprise a plurality of data element definitions;
- transmitting the first set of metadata specifications to a remote system;
- for the remote system, performing an operation flow that is to occur in response to a detection at the remote system of a defined event, the operation flow comprising:
  - transmitting, to the remote system, one or more references to a first subset of the first set of metadata specifications, where the first subset of the first set of metadata specifications comprises specifications of interface elements, and the transmitting the one or more references causes the remote system to configure an interface in accordance with the specifications of interface elements;
  - receiving, from the remote system, one or more responses to the transmitting of the one or more references, the one or more responses comprising data collected by the remote system in conjunction with the defined event; and
  - upon determination that the one or more responses satisfy a set of one or more parameter constraints, controlling access of the remote system or an agent system to a resource in accordance with a protocol, or, upon determination that the one or more responses fail to satisfy the set of one or more parameter constraints, transmitting an alert to the remote system that is indicative of at least one of the one or more references and/or one or more additional references to a second subset of the first set of metadata specifications; and
- subsequent to the performing of the operational flow, changing requirements corresponding to one or more subsequent operational flows based at least in part on transmitting a second set of metadata specifications or one or more references to a third subset of the first set of metadata specifications to the remote system.

16. The one or more non-transitory, computer-readable media as recited in claim 15, the operations further comprising:
for the remote system, performing at least one operation flow of the one or more subsequent operational flows, the at least one operation flow comprising:
- transmitting, to the remote system, one or more references to a first subset of the second set of metadata specifications, where the first subset of the second set of metadata specifications comprises second specifications of interface elements, and the transmitting the one or more references causes the remote system to configure an interface in accordance with the second specifications of interface elements;
- receiving, from the remote system, one or more responses to the transmitting of the one or more references to the first subset of the second set of metadata specifications; and
- determining whether the one or more responses to the transmitting of the one or more references to the first subset of the second set of metadata specifications satisfy the set of one or more parameter constraints or a different set of one or more parameter constraints.

17. The one or more non-transitory, computer-readable media as recited in claim 16, where:
the at least one operation flow of the one or more subsequent operational flows is to occur in response to a subsequent detection at the remote system of the defined event; and
the one or more responses to the transmitting of the one or more references to the first subset of the second set of metadata specifications comprise data collected by the remote system in conjunction with the defined event.

18. The one or more non-transitory, computer-readable media as recited in claim 16, the operations further comprising:
upon a determination that the one or more responses to the first subset of the second set of metadata specifications satisfy the set of one or more parameter constraints or the different set of one or more parameter constraints, controlling access of the remote system or the agent system to the resource or a different resource; or
upon a determination that the one or more responses to the first subset of the second set of metadata specifications fail to satisfy the set of one or more parameter constraints or the different set of one or more parameter constraints, transmitting another alert to the remote system.

19. The one or more non-transitory, computer-readable media as recited in claim 15, the operations further comprising:
- for the remote system, performing at least one operation flow of the one or more subsequent operational flows, the at least one operation flow comprising:
  - transmitting, to the remote system, one or more references to the third subset of the first set of metadata specifications, where the third subset comprises second specifications of interface elements, and the transmitting the one or more references causes the remote system to configure an interface in accordance with the second specifications of interface elements;
  - receiving, from the remote system, one or more responses to the transmitting of the one or more references to the third subset; and
  - determining whether the one or more responses to the transmitting of the one or more references to the third subset satisfy the set of one or more parameter constraints or a different set of one or more parameter constraints.

20. The one or more non-transitory, computer-readable media as recited in claim 19, the operations further comprising:
- upon a determination that the one or more responses to the third subset satisfy the set of one or more parameter constraints or the different set of one or more parameter constraints, controlling access to the resource or a different resource; or
- upon a determination that the one or more responses to the third subset fail to satisfy the set of one or more parameter constraints or the different set of one or more parameter constraints, transmitting another alert to the remote system.

* * * * *